US007575722B2

(12) United States Patent
Arnold

(10) Patent No.: US 7,575,722 B2
(45) Date of Patent: Aug. 18, 2009

(54) MICROFLUIDIC DEVICE

(75) Inventor: Don W. Arnold, Livermore, CA (US)

(73) Assignee: Eksigent Technologies, Inc., Dublin, CA (US)

(*) Notice: Subject to any disclaimer, the term of this patent is extended or adjusted under 35 U.S.C. 154(b) by 434 days.

(21) Appl. No.: 10/599,525

(22) PCT Filed: Apr. 1, 2005

(86) PCT No.: PCT/US2005/011025

§ 371 (c)(1),
(2), (4) Date: Sep. 29, 2006

(87) PCT Pub. No.: WO2005/097667

PCT Pub. Date: Oct. 20, 2005

(65) Prior Publication Data

US 2007/0272001 A1 Nov. 29, 2007

Related U.S. Application Data

(60) Provisional application No. 60/559,383, filed on Apr. 2, 2004.

(51) Int. Cl.
*B01L 3/02* (2006.01)
*G01N 11/00* (2006.01)

(52) U.S. Cl. .................................... 422/100; 73/53.01

(58) Field of Classification Search ....................... None
See application file for complete search history.

(56) References Cited

U.S. PATENT DOCUMENTS

| | | | |
|---|---|---|---|
| 6,090,251 | A | 7/2000 | Sundberg et al. |
| 6,167,910 | B1 | 1/2001 | Chow |
| 6,238,538 | B1 | 5/2001 | Parce et al. |
| 6,274,089 | B1 | 8/2001 | Chow |
| 6,709,559 | B2 | 3/2004 | Sundberg |
| 6,766,817 | B2 | 7/2004 | da Silva |
| 6,918,404 | B2 | 7/2005 | Dias da Silva |
| 7,066,586 | B2 | 6/2006 | da Silva |

OTHER PUBLICATIONS

International Search Report for PCT/US2005/011025 dated May 15, 2006, 2 pages.
Notification Concerning Transmittal of Copy and International Preliminary Report on Patentability for PCT/US2005/011025 dated Oct. 4, 2006, 5 pages.

*Primary Examiner*—Jill Warden
*Assistant Examiner*—Timothy G Kingan
(74) *Attorney, Agent, or Firm*—Sheldon Mak Rose & Anderson

(57) ABSTRACT

Microfluidic systems including a principal microfluidic conduit (24), an adjacent dead volume (1) and a drain conduit (70) which mitigates the adverse effects of the dead volume on the operation of the system.

15 Claims, 1 Drawing Sheet

MICROFLUIDIC DEVICE

CROSS-REFERENCE TO RELATED APPLICATIONS

This application claims priority from Provisional Application No. 60/559,383, entitled Improved Optical Detection Device, filed Apr. 2, 2004, the entire disclosure of which is incorporated herein by reference for all purposes.

This application is related to (1) copending, commonly assigned U.S. patent application Ser. No. 10/410,313, filed Apr. 7, 2003 and issued on May 23, 2006 as U.S. Pat. No. 7,050,660, (2) PCT application PCT/US 04/10234, filed Apr. 2, 2004, by Eksigent Technologies LLC, claiming priority from Ser. No. 10/410,313, (3) copending, commonly assigned U.S. Provisional Application No. 60/559,140 filed Apr. 2, 2004, by Don Arnold et al. and entitled Microfluidic Connector and (4) the copending, commonly assigned International (PCT) application PCT/US05/11021, filed on Apr. 1, 2005 by Don Arnold et al. and entitled Microfluidic Connections. The disclosure of each of the above-identified applications is incorporated herein by reference for all purposes.

STATEMENT REGARDING FEDERALLY SPONSORED RESEARCH OR DEVELOPMENT

This invention was made with United States Government support under 70NANB3H3048 awarded by the National Institute of Standards and Technology (NIST). The United States Government has certain rights in the invention.

BACKGROUND OF THE INVENTION

This invention relates to microfluidic devices.

The existence of dead volumes is a recognized problem in systems comprising microfluidic devices. Dead volumes are particularly likely to exist at junctions between different microfluidic conduits and between microfluidic devices and conventional capillaries and other macroscopic apparatus. Dead volumes are particularly undesirable in analytical apparatus, because they cause dispersion in samples derived from, or directed to, liquid chromatography columns, and disturb the distribution of particles in samples to be examined in cytometry and like procedures.

The making of junctions comprising microfluidic conduits (for example junctions between a microfluidic conduit and a conventional elongate component, e.g. a capillary tube, optical fiber or electrical lead) presents many problems. The problems increase when a plurality of closely-spaced junctions must be made, and/or it is desirable to make a junction which can be disassembled, e.g. to remove debris. Known methods of making such junctions are disclosed, for example, in U.S. Pat. Nos. 6,605,472, 6,319,476, 6,620,625 and 6,832,787, U.S. Patent Application Publication Nos. US 2002/0043805 and 2003/0173781, International Publication Nos. WO/98/25065, WO/98/33001, WO 00/52376, WO 01/86155, and WO 02/070942, Sensors and Actuators B 49, 40-45 (1998) (Gonzales et al), Anal. Methods Instrum. 2 (1995) 74 (Ockvirk et al), Anal. Chem. 71, 3292 (1999) (Bings et al), Lab-on-a-Chip 1, 148-152 (2001) (Nittis et al), and Lab-on-a-Chip 2, 42-47(2003) (Kopf-Sill), the entire disclosures of which are incorporated herein by reference for all purposes.

SUMMARY OF THE INVENTION

I have discovered, in accordance with the present invention, that the adverse effects of a dead volume in a system comprising a microfluidic conduit can be mitigated by providing a drain conduit from the dead volume.

In a first preferred aspect, this invention provides a system comprising (1) a principal microfluidic conduit, (2) a dead volume adjacent to and in liquid communication with the principal microfluidic conduit, and (3) a drain conduit from the dead volume.

In a second preferred aspect, this invention provides a method of conveying a liquid through a system of the first preferred aspect of the invention, the method comprising causing the liquid to flow simultaneously through the principal microfluidic conduit, the dead volume and the drain conduit.

BRIEF DESCRIPTION OF THE DRAWINGS

The invention is illustrated by the accompanying drawings, which are diagrammatic and not to scale, and in which the Figures are cross-sections through systems in accordance with the invention.

DETAILED DESCRIPTION OF THE INVENTION

Figure 1:
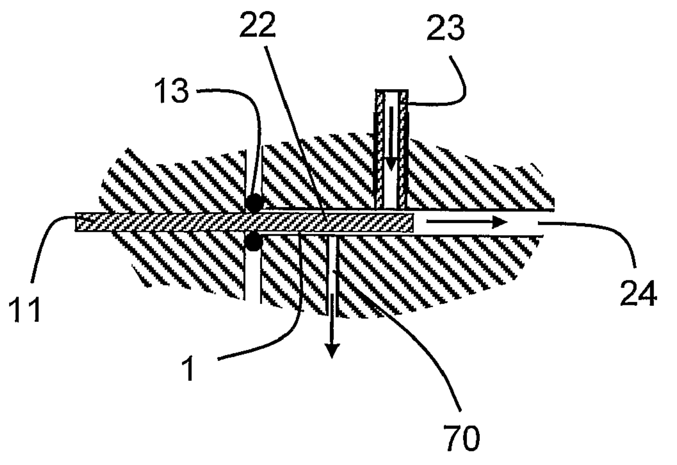
FIG. 1 shows a capillary tube inlet conduit connected to a principal microfluidic conduit.

In the Summary of the Invention above, the Detailed Description of the Invention, the Examples, and the Claims below, and the accompanying drawings, reference is made to particular features of the invention, such features including for example aspects, components, ingredients, devices, apparatus, systems, steps and embodiments. It is to be understood that the disclosure of the invention in this specification includes all possible combinations of such particular features. For example, where a particular feature is disclosed in the context of a particular aspect, a particular embodiment, a particular Figure, or a particular claim, that feature can also be used, to the extent possible, in the context of other particular aspects, embodiments, Figures and claims, and in the invention generally. The invention claimed herein includes the use of features which are not specifically described herein but which provide functions which are the same as, equivalent to, or similar to, features specifically described herein.

The term "comprises" and grammatical equivalents thereof are used herein to mean that other features are optionally present. For example, an assembly "comprising" (or "which comprises") components A, B and C can contain only components A, B and C, or can contain not only components A, B and C but also one or more other components. Where reference is made herein to a method comprising two or more defined steps, then, unless the context requires otherwise, the defined steps can be carried out in any order or simultaneously, and the method can include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example "at least 4" means 4 or more than 4, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 6 to 500" or "6-500" means a range whose lower limit is 6 and whose upper limit is 500. The numbers given herein should be construed with the latitude appropriate to their context and expression. The terms "plural" and "plurality" are used herein to mean two or more. The terms "planar face" and "planar surface" are used herein to denote a surface such that a straight line joining any two points on the surface lies wholly on the surface.

When reference is made herein to "a", "an", "one" or "the" feature, it is to be understood that, unless the context requires otherwise, there can be one or more than one such feature. For example, when reference is made herein to a feature selected from a list of features, it is to be understood that, unless the context requires otherwise, the feature can be a single one of the listed features or two or more of the listed features.

When reference is made herein to a first feature and/or a second feature, it is to be understood that unless the context requires otherwise, such terminology is used herein for convenience in identifying such features, and means that either or both features can be present, and that when both features are present, they can be the same or different.

Where reference is made herein to two or more components (or parts or portions etc.), it is to be understood that the components can be, unless the context requires otherwise, separate from each other or integral parts of a single structure or a single component acting as the two or more specified components.

The term "microfluidic conduit" is used herein to denote an elongate conduit of circular or non-circular cross-section having an equivalent diameter of at most 1.0 mm; the term includes any conduit having the specified dimensions, and is not limited to conduits through which, in use, a fluid flows. The term "equivalent diameter" is used herein to denote the diameter of a circle having the same cross-sectional area as the cross-sectional area of the conduit. The term "elongate" is used to denote a conduit having one dimension (its length) which is substantially greater than, preferably at least 4 times, e.g. at least 6 times, each of its other dimensions. The references herein to the diameter of a conduit refer to the internal equivalent diameter of the conduit, unless otherwise stated.

The term "microfluidic substrate" is used herein to denote a substrate containing a microfluidic conduit. The term "microfluidic chip" is used herein to denote a microfluidic substrate manufactured by a process which includes forming a pattern on a wafer and bonding the patterned face of wafer to another wafer.

The term "alignment axis", when used herein in relation to an alignment feature which is a planar surface, denotes a line which lies in the surface (and which is parallel to the conduit axis of any FEP or SEP conduit present in the substrate). The term "dead volume" is used herein to denote a volume which, when the system is in operation and in the absence of the drain conduit (or if the drain conduit is blocked), is not swept by liquid passing through the adjacent principal microfluidic conduit and which, therefore, relies on diffusion to clear the volume. The term "drain conduit" is used herein to denote a conduit through which, when the system is in operation, liquid flows in a direction away from the principal microfluidic conduit, and thus prevents or substantially reduces the dispersion which would otherwise occur as a result of diffusion from the dead volume.

Conduits

The principal conduit, which is adjacent to, and in liquid communication with, the dead volume, is a microfluidic conduit as defined above, i.e. has a diameter of at most 1 mm. Some or all of the other conduits in the system can also be microfluidic conduits, but this is not necessarily the case, particularly at junctions between a principal conduit and a capillary tube forming part of a conventional, relatively large, apparatus. The microfluidic conduits can for example be capillary tubes, and/or conduits formed by joining together mating faces of two substrates, e.g. silicon wafers, having mirror image patterns etched into them. The conduits can for example have an equivalent diameter of 0.1 to 500 micrometers, e.g. 1 to 300 micrometers.

In preferred embodiments, each of the conduits in the system defines a flow path whose cross-section is substantially circular or an annulus of substantially constant width. The invention is, therefore, often described with reference to such preferred embodiments. However, the invention includes devices in which this is not true. For example, one or more of the conduits can be of non-circular (e.g. rectangular) cross-section, and/or an arm in a conduit or junction can be off-centered and/or can be of non-circular cross-section (for example the arm can be one of the commercially available optical fibers having a non-circular cross-section). In these cases, the system will contain a flow path whose cross-section is not circular and/or is an annulus which is irregular in width.

The dimensions of the drain conduit, the dead volume and the principal microfluidic conduit are preferably such that each of (i) the volumetric flow rate through the drain conduit and (ii) the volumetric flow rate through the dead volume is 0.005 to 0.08 times, preferably 0.01 to 0.04 times, the volumetric flow rate through the principal conduit.

The drain conduit can be connected to waste outlet, or it can be connected to a different part of the system, for example so that liquid passing through the drain conduit rejoins the main liquid flow at a later stage, for example, after the liquid has been subjected to examination which does not make any permanent change to its ingredients.

There can be a plurality of drain conduits connected to the dead volume. The drain conduit can contain a valve to control the rate at which liquid passes through it or to prevent liquid from passing through it. Generally, however, there is no valve in the drain conduit, since the drain conduit is open throughout the time that the liquid is passing through the principal conduit and can be appropriately sized for this purpose.

Pressures, Pressure Sources and Flow Rates

Any pressure source can be used to drive the liquid in the systems of the invention. Suitable pressure sources include electrokinetic pumps, electrokinetic flow controllers, mechanically activated pumps, pneumatically activated pumps with or without a hydraulic amplifier, and combinations thereof. Reference may be made for example to U.S. Pat. No. 5,942,093, US Patent Application Publication Nos. 2002-0189947 and 2002-0195344, and International Publication No. WO 2004/027535, the entire disclosures of which are incorporated herein by reference.

The pressure used to drive the liquid, which is preferably but not necessarily substantially constant, can be high or low, for example from 15 to 10,000 psi, generally from 15 to 5000 psi. (1 to 700, generally 1 to 350, kg/cm$^2$).

The rate at which the liquid flows through the principal microfluidic conduit, which is preferably, but not necessarily, substantially constant, can be high or low, for example from 1 to 100,000 nL/min, generally 10 to 5000 nL/min, e.g. 100 to 2500 nL/min.

Liquids.

Any liquid can be cause to flow through the systems of the invention. The invention is particularly valuable when the liquid is an analytical sample containing one or more analytes. In some such samples, the analytes are dissolved in a liquid, as for example in (i) samples derived from a liquid chromatography (LC) column, particularly from an LC microcolumn (μLC column), (ii) samples to be passed through an LC column, particularly a μLC column, and (iii) samples to be examined by exposing the sample to light which elicits an identifiable response from the sample, for example as disclosed in the copending Ser. No. 10/410,313 and PCT/US 04/10234 referred to above and incorporated by reference herein.

Dead Volumes

The dead volume can be of any shape. In some embodiments, the dead volume is an annular passageway. The annular passageway can for example be a long thin passageway having an outer diameter which is less than 1.1 times, e.g. 1.001 to 1.01 times, its inner diameter, and a length which is substantially greater than, for example 2 to 20 times, e.g. 3 to 10 times, its inner diameter.

The existence of a long thin annular dead space can result from the difficulty of placing an elongate element, for example a capillary tube, an optical fiber or an electrical lead in a junction in a way which does not adversely affect the desired flow of liquid through the junction. The elongate element must be sealed within a conduit having a diameter larger than the outside diameter of the elongate member, and for optimum results, the sealant must neither interfere with the flow of liquid through the junction (which the sealant will do if it extends into the junction) nor create a dead volume (which it will do if it stops short of the junction). Similar problems arise in controlling the positioning of the sealant or adhesive when two substrates, each containing a microfluidic conduit terminating at a face, are to be joined together face-to-face with the aid of an adhesive or sealant, so that the two conduits are joined together. In this case, if the adhesive or sealant stops short of the junction, a short fat annular dead volume is created.

The copending, commonly assigned U.S. Provisional Application No. 60/559,140 and the copending, commonly assigned International (PCT) application filed contemporaneously with this application referred to above and incorporated herein by reference, describe a simple and effective way in which a junction can be made between (i) a first substrate including a conduit and an elongate component (e.g. an optical fiber, capillary tube, or electrical lead) which protrudes from the substrate and is sealed into the conduit, and (ii) a second substrate having a corresponding conduit into which the elongate component is to be placed. Each of the substrates has a pair of spaced-apart alignment features (for example, adjacent faces of the substrate at right angles to each other, or grooves in opposite sides of the substrate). The substrates are positioned on a jig having location features corresponding to the alignment features (for example two flat surfaces at right angles to each other, or two opposed flanges). One or both of the substrates is then moved relative to the other, maintaining the alignment features in contact with the location features, so that the elongate component enters the conduit, and the substrates are brought into a sealable relationship around the elongate component. Preferably, a deformable gasket is (i) placed over the protruding elongate component before the first substrate is positioned on the jig, or while it is positioned on the jig, and (ii) is compressed by the relative movement of the substrates to form a liquid-tight seal between the elongate component and the substrates. In this way, the junction can be fluid-tight so long as the substrates are pressed together, but can be disassembled by removing the pressure. An alternative way of making the junction fluid-tight is to secure the substrates together permanently, e.g. through the use of an adhesive to secure the substrates together directly or indirectly (e.g. through a gasket, which may be deformable or substantially undeformable).

Although this method has a number of important advantages, it does have the disadvantage of producing an annular passageway which extends away from the junction to the point at which the elongate element is sealed into the conduit in the first substrate. This annular passageway is a dead volume. However, the potential disadvantage of the annular passageway can be substantially removed by making use of the present invention.

Systems

One embodiment of the invention is a system comprising (1) a principal microfluidic conduit;

(2) a microfluidic inlet conduit which
   (i) is at an angle to the principal microfluidic conduit, and
   (ii), meets and is in liquid communication with the principal microfluidic conduit at a junction;

(3) an elongate arm, preferably an optical fiber, which
   (i) extends into the junction, and
   (ii) has an outer surface which forms, with walls of the junction, a passageway of substantially annular cross-section through which, when the system is in operation, liquid flows as it flows between the principal and inlet conduits;

(4) a junction conduit, the principal and junction conduits having substantially coincident axes, and the junction conduit
   (i) extending from the junction away from the principal conduit, and
   (ii) having a diameter larger than the outer surface of the arm;

the arm being sealed within the junction conduit at a location removed from the junction, thus creating an elongate chamber of substantially annular cross-section between the arm and the junction conduit; and (5) a drain conduit which is in liquid communication with the chamber.

Figure 2:
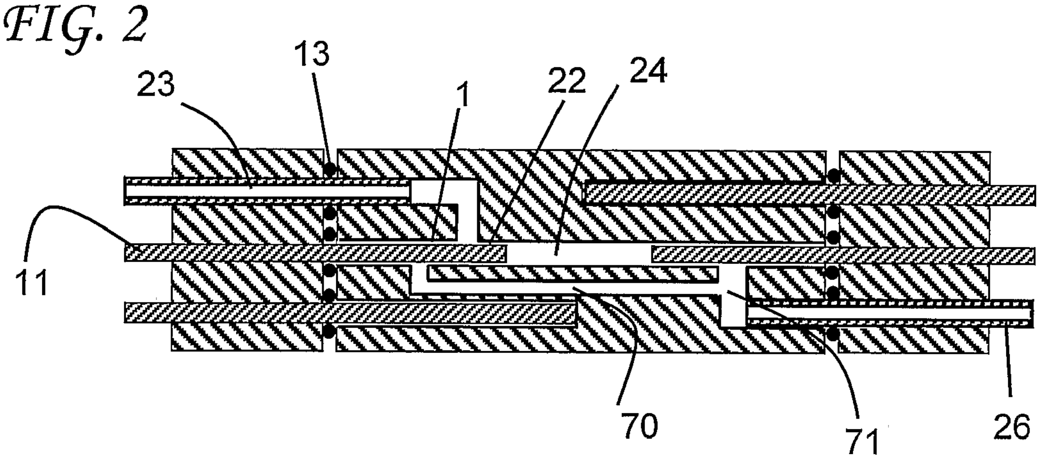
FIG. 2 shows a device incorporating a junction and drained dead volume as shown in FIG. 1.

A particular example of this embodiment of the invention is an examination device for examining a liquid sample, as defined in claim 8 below. An example of a device of this kind is illustrated in FIG. 2.

The first drain conduit can if desired be in liquid communication with the outlet conduit so that the small proportion of the liquid sample which is removed through the drain conduit rejoins the principal liquid flow after the sample has been examined in the detection conduit. However, if the liquid sample, after it has passed through the detection device is to be subjected to further examination, e.g. in a mass spectrometer, the results of the further examination can be adversely affected if the travel times of liquids passing through the detection conduit and through the drain conduit are different. For example, a large peak in the initial sample can provide a second peak from the small proportion of the sample which passed through the drain conduit. It is preferred, therefore, if the sample is to be subjected to further examination, to provide a separate exit for the drain conduit.

In an examination device of this kind, the second arm defines, with the second junction conduit, a second dead volume of substantially annular cross-section. If the sample is not to be subjected to further examination, dispersion resulting from the second dead volume does not cause any problems. However, if the sample is to be subjected to further examination, the device preferably includes a second drain conduit which extends from the second dead volume. The first and second drain conduits can be run to separate exits or to a shared exit. The presence of such a second drain conduit also has the advantage (whether or not the sample is to be subjected to further examinations that the device is now symmetrical, so that samples can be run through the device in either direction.

An examination device of this kind is similar to the examination devices disclosed in the PCT applications incorporated by reference, except that the devices disclosed in those applications do not contain drain conduits. Reference may be made, therefore, to those applications for additional details. For example, the examination device optionally has one or more of the following characteristics (A)-(H):

(A) (a) each of the first and second arms is a cylinder having a first substantially constant diameter;
  (b) the first junction has walls forming a cylindrical shell which (i) has a second substantially constant diameter which is larger than the first diameter, and (ii) with the first arm, defines a substantially annular region;
  (c) the second junction has walls forming a cylindrical shell which (i) has the second substantially constant diameter, and (ii) with the second arm, defines a substantially annular region;
  (d) the detection conduit has walls forming a cylindrical shell having the second substantially constant diameter;

(B) the detection conduit has walls having an index of refraction which is higher than the index of refraction of the liquid sample;

(C) the detection conduit lies in a substrate which is substantially transparent to selected wavelengths of light such that fluorescence, degenerate four-wave mixing, Raman or refractive index measurements can be taken through the substrate; and (D) (a) the device includes a substantially monolithic body including (i) the inlet conduit, (ii) the outlet conduit, (iii) the detection conduit, (iv) the first junction conduit, and (v) the second junction conduit,
  (b) the device includes comprises an inlet capillary tube which lies within the inlet conduit;
  (c) the device includes an outlet capillary tube which lies within the outlet conduit;

(E) the arms are substantially identical optical fibers;

(F) each of the arms is an optical fiber having a substantially circular and constant cross-section which has a first outer diameter, and the detection conduit has a substantially circular and constant cross section having a second diameter which is greater than the first outer diameter;

(G) each of the substantially annular passageways has a length which is 1-40 times, preferably 4-10 times, the first outer diameter; and (H) the average width of each of the substantially annular passageways is 0.001 to 0.2 times, preferably 0.01 times to 0.05 times, the second diameter.

Preparation of Systems

Any method can be used to prepare the systems of the invention. A preferred method is described in the applications incorporated herein by reference. That method preferably comprises providing two microfluidic substrates, each of which has a pair of alignment features thereon, one having an elongate component extending from it and the other having a conduit within it; placing the substrates on an alignment jig with the alignment features in contact with the alignment jig; and sliding one or both of the substrates along the alignment jig so that the elongate component enters the conduit. For further details, reference may be made to the applications referred to above.

Drawings

Referring now to the drawings, FIG. 1 shows a capillary tube inlet conduit 23 connected to a principal microfluidic conduit 24. An elongate component 11 has a free portion 22 which extends into the conduit 24 and forms, with the walls of the conduit 24, (1) a junction passageway of annular cross-section through which liquid flows from the inlet conduit 23 to the principal conduit 24, and (2) a dead volume 1 which has an annular cross-section, extends away from the junction and is sealed by gasket 13. Drain conduit 70 is connected to the dead volume 1.

FIG. 2 shows a device incorporating a junction and drained dead volume as shown in FIG. 1. The device is made up of three substrates which are joined together by liquid tight junctions as described referred to above. Each of the terminal substrates introduces into the central substrate, via gaskets 13, a capillary tube, an optical fiber and a passive elongate component. The capillary tubes 23 and 26 respectively introduce a liquid sample into, and remove the sample from, a principal conduit 24 in which the sample is examined. The optical fibers form (1) passageways of annular cross-section through which the liquid sample flows and (2) dead volumes with the walls of the conduit extending away from the junctions. The passive elongate components help to guide the capillary tubes and optical fibers into corresponding conduits in the central substrate. Drain conduit 70 drains the dead volume 1 and is connected to the capillary 26 within the central substrate.

Figure 3:
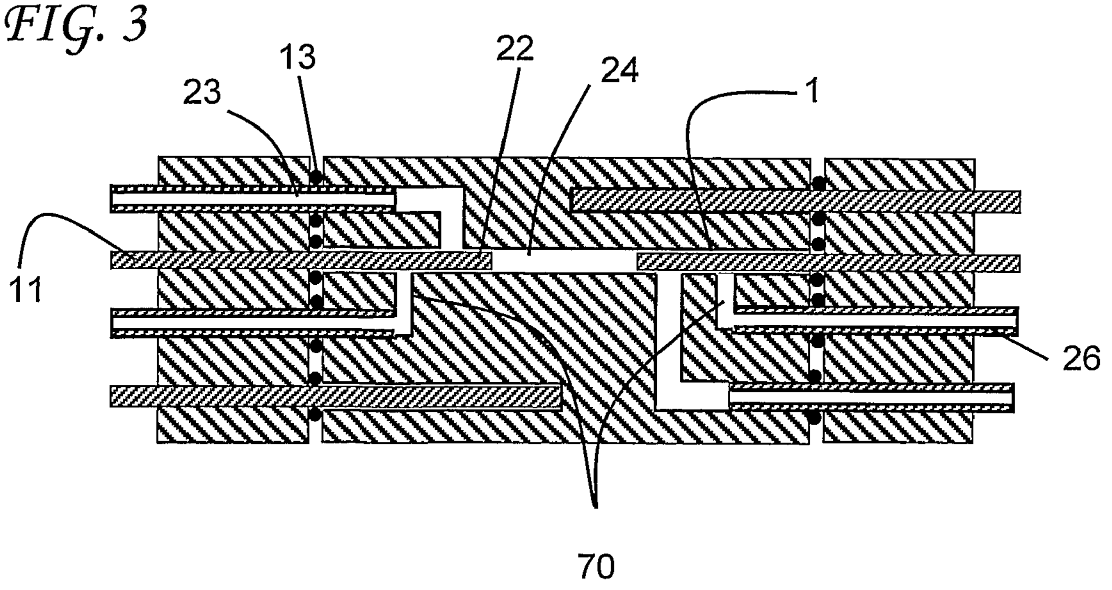
FIG. 3 is similar to FIG. 2 but (1) includes an additional drain conduit which drains the dead volume at the exit junction and (2) sends liquid from the drain conduits to a waste outlet.

FIG. 3 is similar to FIG. 2 but (1) includes an additional drain conduit 70 which drains the dead volume at the exit junction and (2) sends liquid from the drain conduits to a waste outlet.

The invention claimed is:

1. A system comprising
(1) a principal microfluidic conduit,
(2) a microfluidic inlet conduit which is in liquid communication with the principal microfluidic conduit at a junction;
(3) an elongate arm which extends from the principal microfluidic channel into the junction and has an outer surface which forms, with walls of the junction, a dead volume adjacent to and in liquid communication with the principal microfluidic conduit;
(4) a drain conduit extending from the dead volume.

2. A system according to claim 1 wherein the principal and inlet conduits meet at an angle to each other at the junction.

3. A system according to claim 2 wherein the outer surface of the elongate arm forms, with the walls of the junction, a passageway of substantially annular cross-section through which, when the system is in operation, liquid flows as it flows from the inlet conduit to the principal conduit.

4. A system according to claim 3 which includes a junction conduit, the axes of the principal and junction conduits being substantially coincident, and the junction conduit
(i) extending from the junction away from the principal conduit, and (ii) having a diameter larger than the outer surface of the arm; and wherein (a) the arm is sealed within the junction conduit at a location removed from the junction, and (b) the dead volume comprises an elongate dead volume of substantially annular cross-section between the arm and the junction conduit.

5. A system according to claim 1 wherein each of (i) the volumetric flow rate through the drain conduit and (ii) the volumetric flow rate through the dead volume, is 0.005 to 0.05 times the volumetric flow rate through the principal conduit.

6. A system according to claim 5 wherein each of (i) the volumetric flow rate through the drain conduit and (ii) the volumetric flow rate through the dead volume is 0.01 to 0.04 times the fluidic resistance of the principal conduit.

7. A system according to claim 1 wherein the principal microfluidic conduit is a detection conduit for examining a liquid sample, and which comprises (1) a microfluidic inlet conduit having a first longitudinal axis;

(2) a microfluidic outlet conduit having a second longitudinal axis;

(3) a detection conduit, the detection conduit being in liquid connection with the inlet conduit and the outlet conduit and which has a third longitudinal axis, the third longitudinal axis being at an angle to the first longitudinal axis and at an angle to the second longitudinal axis;

(4) a first junction which lies between the inlet conduit and the detection conduit;

(5) a second junction which lies between the detection conduit and the outlet conduit;

(6) a first junction conduit which extends from the first junction away from the detection conduit, the first junction conduit and the detection conduit having substantially coincident axes;

(7) a second junction conduit which extends from the second junction away from the detection conduit, the second junction conduit and the detection conduit having substantially coincident axes;

(8) a first arm which (i) lies within the first junction conduit and extends into the first junction, (ii) defines, with the first junction conduit, the dead volume, the dead volume having a substantially annular cross-section, and (iii) defines, with walls of the first junction, a first passageway of substantially annular cross-section through which the liquid sample flows as it flows from the inlet conduit to the detection conduit;

(9) a second arm which (i) lies within the second junction, and extends into the second junction, and (ii) defines, with walls of the second junction, a second passageway of substantially annular cross-section through which the liquid sample flows as it flows from the detection conduit to the outlet conduit; and

(10) a first drain conduit which extends from the dead volume.

8. A system according to claim 7 wherein each of the first and second arms is an optical fiber or an electrical lead.

9. A system according to claim 7 wherein the second arm defines, with the second junction conduit, a second dead volume of substantially annular cross-section, and the device includes a second drain conduit which extends from the second dead volume.

10. A method of conveying a liquid through a system as claimed in claim 1, the method comprising causing the liquid to flow simultaneously through the principal microfluidic conduit, the dead volume and the drain conduit.

11. A method according to claim 10 wherein the liquid is an analytical sample comprising a solvent and analytes dissolved in the solvent.

12. A method according to claim 10 wherein the sample is the product of a liquid chromatography column.

13. A method of examining a liquid sample which comprises passing the sample through a system as claimed in claim 7, comprising the steps of exposing the sample to light while it is in the detection conduit, and examining a signal from the sample.

14. A method of examining a liquid sample which comprises passing the sample through a system as claimed in claim 7, exposing the sample to an electrical effect while it is in the detection conduit, and examining a signal from the sample.

15. A method according to claim 14 wherein the sample is the product of a liquid chromatography microcolumn.

* * * * *